Figure 1:
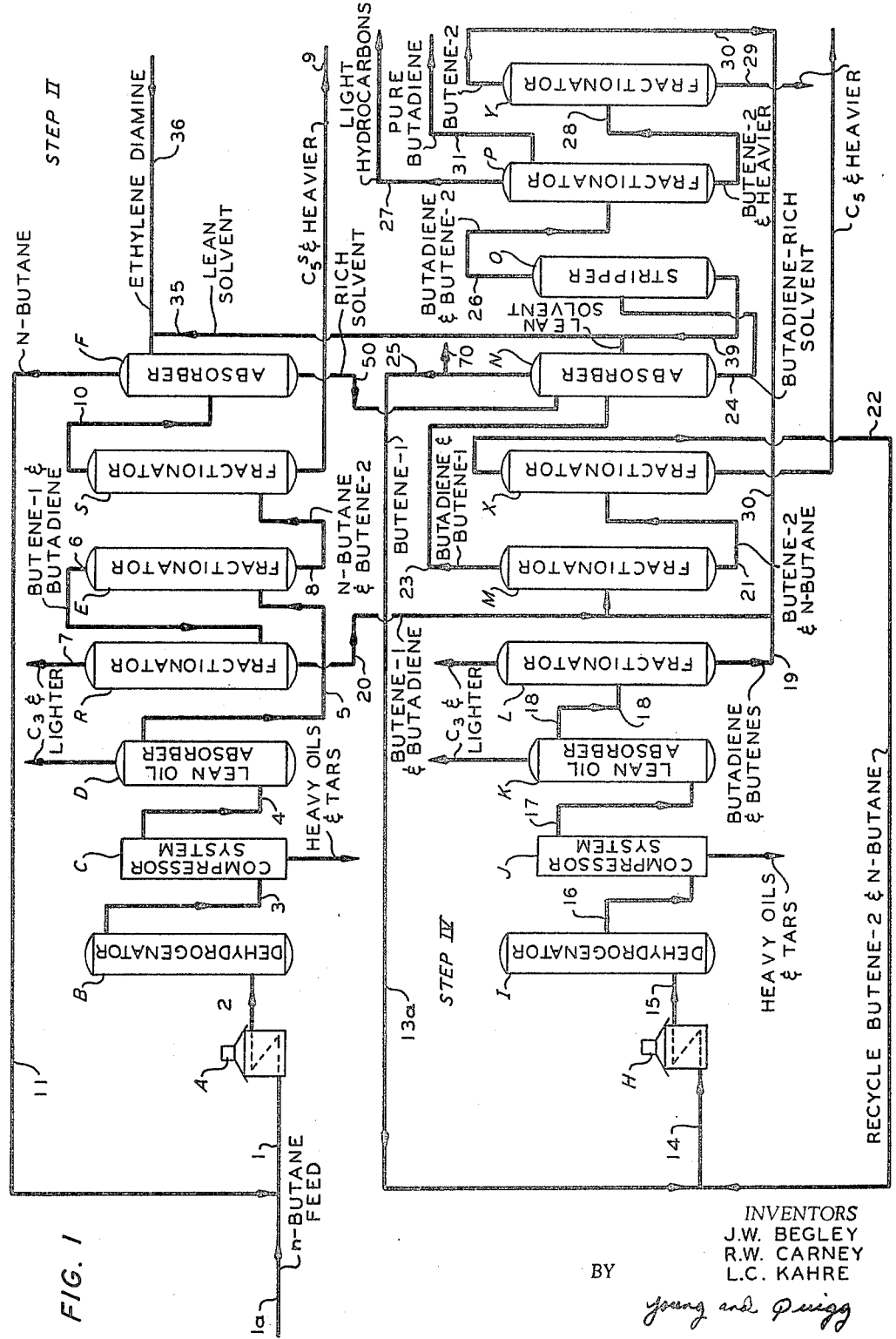

INVENTORS
J.W. BEGLEY
R.W. CARNEY
L.C. KAHRE
BY
Young and Quigg
ATTORNEYS

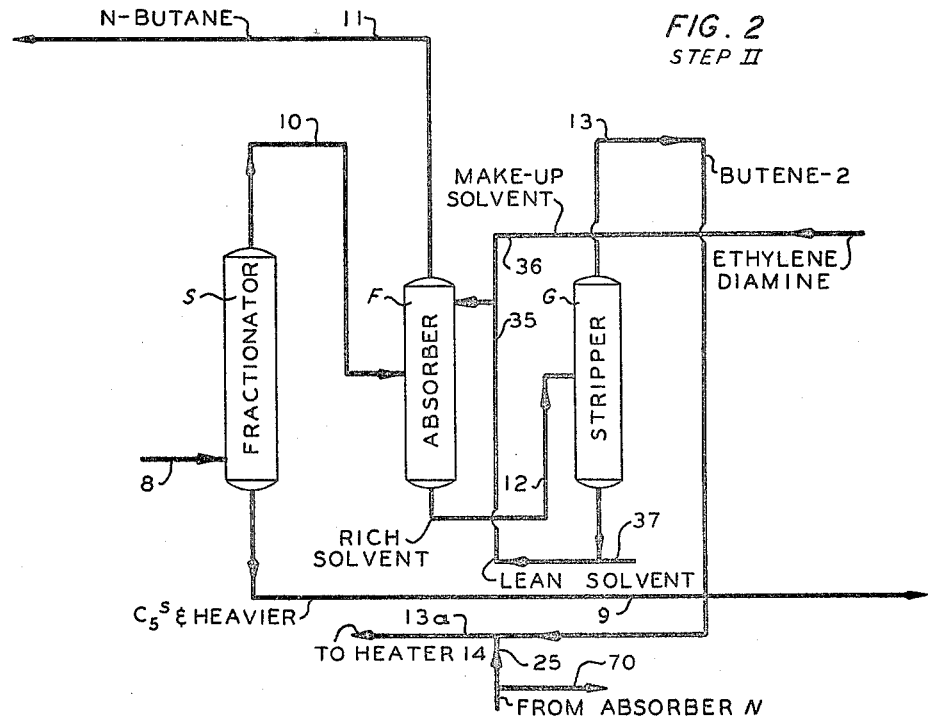
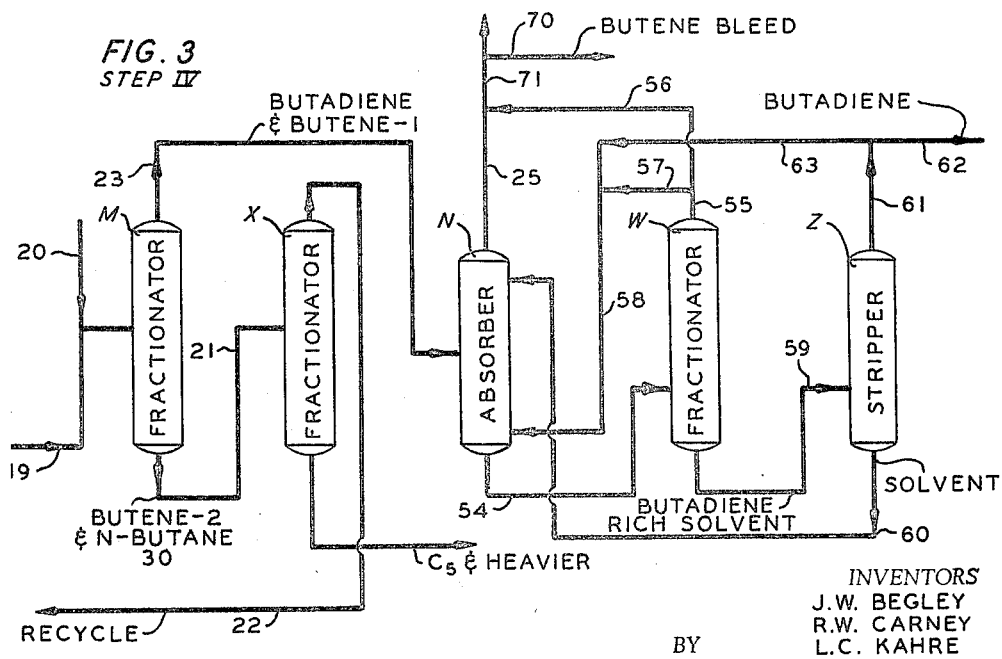

United States Patent Office 3,284,339
Patented Nov. 8, 1966

3,284,339
PROCESS FOR SEPARATION OF HYDROCARBONS FROM MORE SATURATED HYDROCARBONS WITH ETHYLENE DIAMINE SOLVENT
John W. Begley, Richard W. Carney, and Le Roy C. Kahre, Bartlesville, Okla., assignors to Phillips Petroleum Company, a corporation of Delaware
Filed Mar. 25, 1963, Ser. No. 267,505
2 Claims. (Cl. 208—87)

This invention relates to a solvent for the liquid extraction and separation of individual hydrocarbons from complex hydrocarbon mixtures containing more saturated hydrocarbons.

Another aspect of the invention relates to the process for the two-stage dehydrogenation of normal butane to butadiene including the recovery of the butadiene in a substantially pure state.

It is well known know to produce butadiene by the following steps: (1) butane dehydrogenation to butenes, (2) butene recovery or purification, (3) butene dehydrogenation to butadiene and (4) butadiene recovery or purification. The use of furfural as a selective solvent in the extractive distillation of butenes and butadiene has made the process practical and economical. Use of furfural permits separations of $C_4$ hydrocarbons which were once considered impossible and impractical on a commercial scale. It is this type of separation upon which the present production of high purity butadiene depends. Furfural absorbers are used to separate normal butane from unsaturated $C_4$ hydrocarbons (step 2) and also for separating butadiene from butenes in the butadiene purification or recovery step (step 4). These absorber columns are of the conventional bubble cap type and in the preferred modification are constructed in six 50 tray sections.

It has now been found possible to employ ethylene diamine as a selective solvent for the separation of normal butane from unsaturated hydrocarbons and also for separating butadienes from butenes in a liquid-liquid extraction unit.

It is an object of the invention to provide a process for producing butadiene from normal butane. It is another object of the invention to provide an improved selective solvent for the liquid-liquid extraction of $C_4$ hydrocarbons from complex mixtures of hydrocarbons. It is another object of the invention to provide a process for the selective absorption of less saturated $C_4$ hydrocarbons from a mixture of more saturated $C_4$ hydrocarbons. Another object of the invention is to provide a more efficient separation of butene-1 and butene-2 from normal butane. A further object of the invention is to provide a more efficient separation of butadiene from butenes.

These and other objects of the invention will become readily apparent to those skilled in the art from the accompanying disclosure, drawings and appended claims.

We have discovered that ethylene diamine is an effective selective solvent for separating olefins from mixtures including paraffins. We have also discovered that ethylene diamine is an effective selective solvent for separating unsaturated hydrocarbons from less saturated hydrocarbons in general and is particularly applicable to the separation of normal butane from unsaturated $C_4$ hydrocarbons and for the separation of butadiene from butene mixtures. However, the invention is not so limited and would be applicable, for example, to the separation of isoprene and mixed amylenes.

For a more complete understanding of the invention, reference may be made to the drawings.

FIGURE 1 is a schematic drawing showing a general process for the preparation of butadiene from normal butanes. Shown particularly herein is the introduction of the rich solvent from the absorber employed for separation of normal butane from butenes directly into the absorber for the separation of butenes and butadiene.

FIGURE 2 contains all the features of FIGURE 1 except that the rich solvent from the absorber is introduced into a stripper and the butenes thus separated are passed into the dehydrogenation unit in the catalytic dehydrogenation of butenes to butadiene.

FIGURE 3 is another concept showing a different treatment for the rich solvent from the absorber employed for the separation of butadiene from the butenes.

Referring now to FIGURE 1, butane is passed through lines 1A and 1 into heater A where it is preheated and then through line 2 into a dehydrogenator B wherein the butane is dehydrogenated to butenes.[1] The products of reaction pass through conduit 3 to compressor system C where they are compressed and cooled between stages in a conventional manner. The dehydrogenation effluent consists principally of hydrogen, butene-1, cis and trans butene-2 and normal butane. Small quantities of light gases other than hydrogen (principally methane, ethylene, ethane, propylene and propane) are also formed in the reaction. Small quanities of isobutane, isobutylene and butadiene appear in the dehydrogenator effluent stream. The quantity of hydrocarbons containing 5 or more carbon atoms is extremely small.

The hydrocarbon vapors from the compression system C are passed via line 4 into a conventional lean oil absorber D where $C_3$'s and lighter are removed overhead. The stripped hydrocarbons from absorber D are passed through line 5 into a fractionator E. The fractionator E is operated in such a manner as to remove butene-1 and essentially all of the butadiene and lighter hydrocarbons as an overhead product which is passed through lines 6 to a second fractionator R which operates as a depropanizer. The $C_3$'s and lighter removed in absorber D are removed from the system as an overhead product through line 7. The kettle product from fractionator E, which contains normal butane, butene-2's and heavier hydrocarbons, is removed from fractionator E and passed through line 8 into deoiler or fractionator S. The $C_5$'s and heavier are removed from fractionator S through line 9. Butane and butene-2's are removed as overhead product from fractionator S through line 10 and enter absorber F wherein separation between normal butane and butene-2's is accomplished by liquid-liquid contacting of the hydrocarbon and the ethylene diamine selective solvent of the invention described herein. The unabsorbed hydrocarbons consisting principally of normal butane pass out of absorber F as an overhead product through line 11 and are recycled into heater A through line 1. Make-up ethylene diamine is introduced through conduit 36 into the absorber F along with a lean solvent through conduit 35 from the absorber N hereinafter described. Rich solvent containing principally butene-2's passes from the absorber F as a kettle product through line 50 directly into absorber N. Conventionally, when employing a fur-

[1] Conversion is on the order of 30 percent; selectively to butylenes is on the order of 80 percent.

fural solvent in extractive distillation, this rich solvent passes from the absorber F as a kettle product into a separate solvent stripper wherein stripped solvent is removed from the kettle product and recycled to the absorber F.

Hydrocarbon feed, consisting essentially of butenes, is passed into heater H through line 14 wherein the hydrocarbons are heated to dehydrogenation temperature and are passed through line 15 into a catalytic dehydrogenation unit I wherein principally butadiene-1,3 is produced. The reaction effluent from dehydrogenation unit I, consisting principally of butadiene, isobutylene, butene-1, normal butane and butenes, is passed through line 16 into a compressor system J and compressed effluent is then passed through line 17 into a conventional lean oil absorption system wherein $C_3$'s and lighter are removed as an overhead product. The $C_4$'s and heavier and absorbed $C_3$'s are passed into a fractionator L through line 18. The remaining $C_3$'s and lighter are removed as an overhead product from fractionator L and the kettle product, consisting essentially of $C_4$'s and heavier, is passed into fractionator M through line 19. The kettle product from fractionator R passes through line 20, is combined with the hydrocarbons in line 19 and is also passed into fractionator M. In fractionator M most of the high boiling butene-2 as well as part of the low boiling butene-2 and $C_4$ acetylenes are removed as bottoms through line 21 and passed into deoiler or fractionator X wherein $C_4$'s are removed as an overhead product and these are recycled through line 22 to line 14. The overhead product from fractionator M, consisting of substatnially all of the butadiene produced in dehydrogenators B and I, is removed through line 23 and passed into absorber N wherein butene-1 is separated from butadiene by liquid-liquid extraction through the use of aqueous ethylene diamine. Preferably in this step 4 process, that is, absorber N, the solvent to feed mol ratio is in the range of 18 to 25:1 when using 5 percent water. When a 2 percent water concentration is used, the solvent to feed mol ratio is preferably in the range of 12 to 15:1. In the step 2 separation of normal butanes from butenes the water ratio is normally in the range of 0 to 10 weight percent water to ethylene diamine with the solvent to feed mol ratio of 30 to 40:1.

As discussed herein, before the rich solvent from the absorber F containing principally butenes is also introduced into absorber N. By this method it is thus possible to eliminate a separate stripper conventionally contained in the line for the rich solvent between absorber F and the heater H. The separation is carried out in absorber N to remove isobutylene with the butene-1 while the absorbed butadiene in this solvent is removed from the absorber via line 24. The overhead product from absorber N is passed through line 25 and is combined with the feed to heater H in line 14. Excess butenes are bled through line 70. The rich solvent containing absorbed butadiene, butene-2 and minor amounts of ther hydrocarbons passes from absorber N through line 24 into stripper O wherein the hydrocarbons are stripped from the solvent and removed as an overhead product through line 26 through which they are passed into a 120 tray fractionating column P wherein butadiene is removed from approximately the 101st stray as the product of the process via line 31. The acetylenes and lighter hydrocarbons are removed as an overhead product through line 27. The kettle product from fractionator P is passed through line 28 into a deoiler or fractionating column Y wherein $C_5$'s and heavier hydrocarbons are removed through line 29 and $C_4$'s and lighter are removed through line 30 and passed to line 19 as feed into a fractionator M. Stripped or lean ethylene diamine is recycled from stripper O to absorber N through line 39 and to absorber F through line 35.

In the drawings heat exchangers, condensers, pumps, valves or reflux are not shown but are understood to be used as in conventional operations.

FIGURE 2 represents a second aspect of the invention wherein the rich solvent from absorber F, containing principally butene-2's, passes from the absorber F through line 12 into solvent stripper G wherein stripped solvent is removed as a kettle product and recycled through line 35 to the absorber F. Butene-2's are removed as an overhead product and are passed through line 13 to 14 to be used as feed in the dehydrogenation of butenes to produce butadiene. Ethylene diamine is introduced as make-up solvent through line 36 into the absorber F. The remainder of this drawing is the same as FIGURE 1 but is not shown for simplification and employs the same reference numerals as those shown in FIGURE 1. However, line 50 as shown in FIGURE 1 does not exist in FIGURE 2.

FIGURE 3 represents another aspect of the invention regarding the step 4 process wherein the butenes are separated from the butadienes. With the selective extractant of this invention, it is possible to increase the selectivity by the addition of small amounts of water. The amount of water will affect the degree of separation of the butene-1's and butene-2's from the butadiene containing mixture. FIGURE 3 represents an aspect where a smaller quantity of water is used as compared to that shown in FIGURES 1 and 2. Therefore, the rich solvent from the absorber N contains a substantial quantity of butene-2's and passes from the absorber N through line 54 into a fractionator W wherein a separation is made between the butene-2's and the remaining butadiene. The overhead product then contains butene-2's and a small quantity of butadiene which is removed through conduit 55. A portion is recycled through lines 57 and 58 back into the absorber N whereas the remainder containing principally butene-2's is removed through conduit 56 into conduit 25. The butadiene rich solvent is removed as kettle product from the fractionator W to line 59 into a stripper Z wherein the ethylene dimaine solvent is stripped of butadiene with the butadiene being removed as overhead product through conduits 61 and 62 as product. A portion of this product may be recycled through conduit 63 and 58 back into the absorber as reflux. The lean solvent is removed as kettle product from the bottom of this stripper through conduit 60 and is recycled back to the upper portion of the absorber. The remainder of the drawing (not shown for simplification) is identical to that shown in FIGURE 2.

The various streams described are not limited strictly to the constitutents named and it should be understood that complete separation of one $C_4$ hydrocarbon from another and of $C_5$ and heavier hydrocarbons from the $C_4$ hydrocarbons is not affected. For instance, the normal butane and butene-2 stream in line 8 leading from fractionator E to fractionator S contains, in addition to the constituents named, a minor amount of $C_5$'s and heavier hydrocarbons which pass into absorber F.

The solvent and process of the invention are applicable to the separation of $C_4$ hydrocarbons from sources other than normal butane and butene dehydrogenation. Other $C_4$ fractions such as those in refinery streams are amenable to separation by the process of the invention.

The invention is best described by reference to the following examples.

EXAMPLE I

In this example butadiene is introduced from a feed stream containing principally normal butane in the process shown in FIGURE 2. In this example the ethylene diamine solvent contains 5 percent water in the step 4 separation of butenes from butadiene. An analysis of the stream is shown in Table I.

Table I

[Moles/hour]

| Stream Number | 1A | 11 | 1 | 10 | 35 | 12 | 13 | 25 |
|---|---|---|---|---|---|---|---|---|
| Stream Name | Fresh Feed | Step I Recycle | Step I Feed | Step I Effluent | Step II Solvent | Extract | To Step III | Step III Recycle |
| Component: | | | | | | | | |
| Isobutane | 6 | 9 | 15 | 9 | 0 | 0 | 0 | 0 |
| Normal butane | 991 | 1,465 | 2,456 | 1,474 | 0 | 54 | 9 | 149 |
| Isobutylene | 0 | 0 | 0 | 5 | 0 | 30 | 5 | 185 |
| Butene-1 | 3 | 5 | 8 | 255 | 0 | 1,498 | 250 | 740 |
| trans-Butene-2 | 0 | 5 | 5 | 254 | 0 | 1,492 | 249 | 656 |
| cis-Butene-2 | 0 | 5 | 5 | 254 | 0 | 1,492 | 249 | 656 |
| Butadiene | 0 | 0 | 0 | 79 | 0 | 473 | 79 | 21 |
| Solvent (EDA plus 5 wt. percent $H_2O$) | 0 | 0 | 0 | 0 | 81,000 | 81,000 | 0 | 0 |
| Totals | 1,000 | 1,489 | 2,489 | 2,330 | 81,000 | 86,039 | 841 | 2,407 |

| Stream Number | 13A | 23 | 39 | 25 | 70 | 24 | 26 |
|---|---|---|---|---|---|---|---|
| Stream Name | Step III Feed | Step III Effluent | Step IV Solvent | Raffinate | Bleed | Step IV Extract | Butadiene |
| Component: | | | | | | | |
| Isobutane | 0 | 0 | 0 | 0 | 0 | 0 | 0 |
| Normal butane | 158 | 153 | 0 | 153 | 4 | 0 | 0 |
| Isobutylene | 190 | 190 | 0 | 190 | 5 | 0 | 0 |
| Butene-1 | 990 | 758 | 0 | 757 | 17 | 31 | 1 |
| trans-Butene-2 | 905 | 671 | 0 | 670 | 14 | 31 | 1 |
| cis-Butene-2 | 905 | 671 | 0 | 670 | 14 | 31 | 1 |
| Butadiene | 100 | 600 | 0 | 22 | 1 | 17,880 | 578 |
| Solvent (EDA plus 5 wt. percent $H_2O$) | 0 | 0 | 60,000 | 0 | 0 | 60,000 | 0 |
| Totals | 3,248 | 3,043 | 60,000 | 2,462 | 55 | 77,973 | 581 |

EXAMPLE II

In this example the absorber N is operated as shown in FIGURE 3 with the solvent containing 2 percent water.

Table II

[Moles/hour]

| Stream Number | 1A | 11 | 11 | 10 | 35 | 12 | 13 | 25 | 13A |
|---|---|---|---|---|---|---|---|---|---|
| Stream Name | Fresh Feed | Step I Recycle | Step I Feed | Step I Effluent | Step II Solvent | Extract | To Step III | Step III Recycle | Step III Feed |
| Component: | | | | | | | | | |
| Isobutane | 6 | 9 | 15 | 9 | 0 | 0 | 0 | 0 | 0 |
| Normal Butane | 991 | 1,465 | 2,456 | 1,474 | 0 | 54 | 9 | 149 | 158 |
| Isobutylene | 0 | 0 | 0 | 5 | 0 | 30 | 5 | 185 | 190 |
| Butene-1 | 3 | 5 | 8 | 255 | 0 | 1,498 | 250 | 740 | 990 |
| trans-Butene-2 | 0 | 5 | 5 | 254 | 0 | 1,492 | 249 | 656 | 905 |
| cis-Butene-2 | 0 | 5 | 5 | 254 | 0 | 1,492 | 249 | 656 | 905 |
| Butadiene | 0 | 0 | 0 | 79 | 0 | 473 | 79 | 21 | 100 |
| Solvent | 0 | 0 | 0 | 0 | 81,000 | 81,000 | 0 | 0 | 0 |
| Totals | 1,000 | 1,489 | 2,489 | 2,330 | 81,000 | 86,039 | 841 | 2,407 | 3,248 |

| Stream Number | 23 | 25 | 54 | 56 | 71 | 70 | 59 | 62 |
|---|---|---|---|---|---|---|---|---|
| Stream Name | Step III Effluent | Step IV Solvent | Raffinate | Extract | Fract. OHP | Butenes | Butene Bleed | Fract. K.P. | Butadiene Product |
| Component: | | | | | | | | | |
| Isobutane | 0 | 0 | 0 | 0 | 0 | 0 | 0 | 0 | 0 |
| Normal Butene | 153 | 0 | 143 | 300 | 10 | 153 | 4 | 0 | 0 |
| Isobutylene | 190 | 0 | 174 | 480 | 16 | 190 | 5 | 0 | 0 |
| Butene-1 | 758 | 0 | 696 | 1,860 | 61 | 757 | 17 | 30 | 1 |
| trans-Butene-2 | 671 | 0 | 615 | 1,680 | 55 | 670 | 14 | 30 | 1 |
| cis-Butene-2 | 671 | 0 | 615 | 1,680 | 55 | 670 | 14 | 30 | 1 |
| Butadiene | 600 | 0 | 18 | 17,640 | 4 | 22 | 1 | 17,520 | 578 |
| Solvent | 0 | 40,000 | 0 | 40,000 | 0 | 0 | 0 | 40,000 | 0 |
| Total | 3,043 | 40,000 | 2,261 | 63,640 | 201 | 2,462 | 55 | 57,610 | 581 |

While certain examples, structures, composition and process steps have been described for purposes of illustration, the invention is not limited to these. Variations and modifications within the scope of the disclosure and the claims can readily be effected by those skilled in the art.

We claim:

1. A process for the preparation of diolefins comprising catalytically dehydrogenating a normal paraffin to form a mixture of paraffins and alkenes, intimately contacting said mixture with ethylene diamine in a first extraction zone, withdrawing raffinate containing said paraffins, withdrawing and passing solvent enriched with said alkenes to a second extraction zone, passing a second mixture containing alkenes to said second extraction zone, passing selective solvent to said second extraction zone, withdrawing and passing raffinate containing monoolefins to a second catalytic dehydrogenation zone wherein a second mixture comprising mono- and diolefins are produced and passed to said second extraction zone as said second mixture, withdrawing and passing solvent enriched with diolefins and containing some monoolefins to an extractive distillation zone, withdrawing monoolefins as overhead, withdrawing solvent enriched with said diolefins and passing same to a stripping zone, recovering said diolefins as overhead, and removing solvent as bottoms product from said stripping zone.

2. A process for the preparation of 1,3-butadiene comprising introducing normal butane into a first catalytic dehydrogenation zone and forming a mixture comprising normal butane and butenes, intimately contacting said mixture with ethylene diamine in a first extraction zone, withdrawing raffinate containing normal butane, withdrawing and passing solvent enriched with said butenes into a second extraction zone, introducing a second mixture comprising butenes and 1,3-butadiene to said second extraction zone, introducing ethylene diamine to said second extraction zone, withdrawing and passing raffinate containing butenes to a second dehydrogenation zone wherein said second mixture comprising butenes and 1,3-butadiene is formed, withdrawing and passing solvent enriched with said 1,3-butadiene and containing some butenes to an extractive distillation zone, withdrawing butenes as overhead, withdrawing and passing solvent enriched with said 1,3-butadiene to a stripping zone, recovering 1,3-butadiene as overhead, and removing solvent as bottoms product from said stripping zone.

References Cited by the Examiner
UNITED STATES PATENTS

| | | | |
|---|---|---|---|
| 2,201,549 | 5/1940 | Van Dijk | 208—311 |
| 2,438,018 | 3/1948 | Nixon et al. | 260—677 |
| 2,886,614 | 5/1959 | Bloch et al. | 260—677 |

OTHER REFERENCES

Cumming et al.: J. Appl. Chem., Aug. 3, 1953, pages 359 to 366.

"Technique of Organic Chemistry," vol. IV, "Distillation," Weissberger, Interscience Pub. Co., N.Y., 1951, page 338.

DELBERT E. GANTZ, *Primary Examiner.*

ALPHONSO D. SULLIVAN, *Examiner.*

H. LEVINE, *Assistant Examiner.*